(12) United States Patent
Son et al.

(10) Patent No.: US 12,313,897 B2
(45) Date of Patent: May 27, 2025

(54) LENS DRIVING DEVICE AND CAMERA MODULE INCLUDING SAME

(71) Applicant: LG INNOTEK CO., LTD., Seoul (KR)

(72) Inventors: Chang Gyun Son, Seoul (KR); Seung Hyeon Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 820 days.

(21) Appl. No.: 17/268,842

(22) PCT Filed: Aug. 14, 2019

(86) PCT No.: PCT/KR2019/010397
§ 371 (c)(1),
(2) Date: Feb. 16, 2021

(87) PCT Pub. No.: WO2020/036450
PCT Pub. Date: Feb. 20, 2020

(65) Prior Publication Data
US 2021/0231904 A1 Jul. 29, 2021

(30) Foreign Application Priority Data
Aug. 16, 2018 (KR) .................. 10-2018-0095508

(51) Int. Cl.
*G02B 7/02* (2021.01)
*G03B 3/10* (2021.01)

(52) U.S. Cl.
CPC ............ *G02B 7/021* (2013.01); *G02B 7/025* (2013.01); *G03B 3/10* (2013.01); *G03B 2205/0069* (2013.01)

(58) Field of Classification Search
CPC .......... G02B 7/02; G02B 7/021; G02B 7/023; G02B 7/08; G02B 7/09; G02B 7/102
See application file for complete search history.

(56) References Cited

U.S. PATENT DOCUMENTS

| 6,134,057 A | 10/2000 | Ueyama et al. |
| 6,160,962 A | 12/2000 | Nomura et al. |

(Continued)

FOREIGN PATENT DOCUMENTS

| CN | 203217151 U | 9/2013 |
| CN | 103369223 A | 10/2013 |

(Continued)

OTHER PUBLICATIONS

Machine translation of WO 2020/027588 retrieved electronically from PE2E Search Dec. 4, 2023 (Year: 2023).*

(Continued)

*Primary Examiner* — Cara E Rakowski
(74) *Attorney, Agent, or Firm* — Saliwanchik, Lloyd & Eisenschenk

(57) ABSTRACT

An embodiment relates to a lens driving device and a camera module including same. The lens driving device according to an embodiment can comprise: a base assembly; and a first lens assembly including a first lens housing and a first driving part housing so as to be disposed inside the base assembly and moving in parallel to a predetermined optical axis. The first driving part housing can comprise one or more first guide rail parts at one side thereof and a first group of balls arranged at the first guide rail part. The first guide rail part can comprise: a first guide body; a first guide groove formed on the first guide body; and a first guide protruding part formed on one side of the first guide body.

18 Claims, 12 Drawing Sheets

(56) References Cited

U.S. PATENT DOCUMENTS

| | | | |
|---|---|---|---|
| 7,869,150 | B2 | 1/2011 | Yoon et al. |
| 9,019,423 | B2 | 4/2015 | Seol et al. |
| 10,114,272 | B2 | 10/2018 | Suzuki et al. |
| 10,156,773 | B2 | 12/2018 | Kim et al. |
| 10,348,968 | B2 | 7/2019 | Sekimoto |
| 2013/0258172 | A1 | 10/2013 | Seol et al. |
| 2014/0355120 | A1* | 12/2014 | Yeo ............ G02B 13/001 359/557 |
| 2015/0296143 | A1 | 10/2015 | Kang et al. |
| 2016/0154204 | A1 | 6/2016 | Lim et al. |
| 2016/0246029 | A1 | 8/2016 | Kim et al. |
| 2016/0299349 | A1 | 10/2016 | Cho |
| 2017/0045710 | A1 | 2/2017 | Lee et al. |
| 2017/0261720 | A1* | 9/2017 | Kang .............. G02B 7/09 |
| 2018/0095341 | A1 | 4/2018 | Lee et al. |
| 2018/0173081 | A1* | 6/2018 | Kim .............. H04N 23/687 |
| 2018/0364450 | A1* | 12/2018 | Lee .............. H04N 23/55 |
| 2019/0049692 | A1 | 2/2019 | Choi et al. |
| 2020/0050083 | A1* | 2/2020 | Jeong .............. G03B 13/34 |
| 2020/0127548 | A1* | 4/2020 | Yeon .............. G03B 5/00 |
| 2021/0389551 | A1 | 12/2021 | Jang |
| 2022/0276462 | A1* | 9/2022 | Jang .............. G03B 3/10 |

FOREIGN PATENT DOCUMENTS

| | | |
|---|---|---|
| CN | 105637399 A | 6/2016 |
| CN | 106291862 A | 1/2017 |
| CN | 107111212 A | 8/2017 |
| CN | 206450888 U | 8/2017 |
| CN | 108345083 A | 7/2018 |
| CN | 207636905 U | 7/2018 |
| CN | 112840268 A | 5/2021 |
| CN | 114174915 A | 3/2022 |
| JP | 58-111003 A | 7/1983 |
| JP | 2007-271889 A | 10/2007 |
| JP | 2015-179230 A | 10/2015 |
| KR | 10-0274384 B1 | 3/2001 |
| KR | 10-0920609 B1 | 10/2009 |
| KR | 10-2013-0081398 A | 7/2013 |
| KR | 10-2015-0117236 A | 10/2015 |
| KR | 10-2016-0024319 A | 3/2016 |
| KR | 10-2016-0086581 A | 7/2016 |
| KR | 10-2017-0130271 A | 11/2017 |
| KR | 10-2017-0131320 A | 11/2017 |
| KR | 10-2018-0012150 A | 2/2018 |
| WO | 2014/042440 A1 | 3/2014 |
| WO | WO-2017/135789 A1 | 8/2017 |
| WO | WO-2020027588 A1 * | 2/2020 ........ G02B 13/009 |

OTHER PUBLICATIONS

Machine translation of KR 10-20180012150 A retrieved electronically from Espacenet, Jul. 11, 2024 (Year: 2024).*
Office Action dated Jan. 21, 2022 in Chinese Application No. 201980060641.7.
Office Action dated Jul. 29, 2022 in Chinese Application No. 201980060641.7.
Office Action dated Jan. 12, 2023 in Korean Application No. 10-2018-0095508.
International Search Report dated Nov. 26, 2019 in International Application No. PCT/KR2019/010397.

* cited by examiner

LENS DRIVING DEVICE AND CAMERA MODULE INCLUDING SAME

CROSS-REFERENCE TO RELATED APPLICATIONS

This application is the U.S. national stage application of International Patent Application No. PCT/KR2019/010397, filed Aug. 14, 2019, which claims the benefit under 35 U.S.C. § 119 of Korean Application No. 10-2018-0095508, filed Aug. 16, 2018, the disclosures of each of which are incorporated herein by reference in their entirety.

TECHNICAL FIELD

Embodiments relate to a lens driving device and a camera module including the same.

BACKGROUND ART

The camera module captures a subject and stores it as an image or a video, and is mounted on a mobile terminal such as a mobile phone, a laptop, a drone, or a vehicle, etc.

On the other hand, portable devices such as smartphones, tablet PCs, and laptops have a compact camera module, and the camera module has an autofocus function that aligns the focal length of the lens by automatically adjusting the distance between the image sensor and the lens.

Recently, a camera module may perform zooming by zooming in or zooming out of a distant subject through a zoom lens. The demand for high magnification zooming more than twice that of camera modules is increasing.

Meanwhile, a friction torque is generated when the lens is moved by mechanical movement using a lens driving device for a zooming function in the camera module. There are technical problems in that the friction torque reduces driving force, increases power consumption, or decreases control characteristics.

In addition, in order to obtain the best optical characteristics in the camera module, the alignment between the lenses must be well matched. However, a decent in which the spherical center between the lenses is deviated from the optical axis or tilt, which is a lens inclination phenomenon, occurs, such that the angle of view changes or defocus occurs, which adversely affects image quality and resolution.

However, in a conventional camera module, the lens housing is moved within a predetermined stroke range by a mechanical movement using a lens driving device for a zooming function. And the camera module is stopped by the stopper at the limit of the moving range, and the reversal of the zoom movement may be possible.

However, in the related art, an impact of a lens mounted on the lens housing may occur due to an impact of the lens housing and the stopper, and there is a technical problem occurring in that the lens decenter or lens tilt may be generated when the zoom movement is reversed.

In addition, due to the impact of the lens housing and the stopper, technical problems are generated such as damage to the stopper itself mounted on the lens housing, deterioration of the reliability of the magnet, and deterioration of control characteristics.

Meanwhile, the contents described in the items merely provide background information on the embodiments, and do not constitute a prior art.

DISCLOSURE

Technical Problem

One of the technical problems of the embodiment is to provide a lens driving device and a camera module including the same, which may reduce friction torque when the lens moves through zooming in the camera module.

In addition, one of the technical problems of the embodiment is to provide a lens driving device and a camera module including the same, which can solve the problem that the lens decent or lens tilt of the lens mounted on the lens housing due to the impact between the lens housing and the stopper.

In addition, one of the technical problems of the embodiment is to provide a lens driving device and a camera including the same, which can solve the problems of the reliability of the magnet mounted on the lens housing, damage of the stopper itself, deterioration of the control characteristics due to the impact of the lens housing and the stopper.

The technical problem of the embodiment is not limited to what is described in this item, includes what can be recognized from the description of inventions.

Technical Solution

The lens driving device according to the embodiment may include a base assembly 20; and a first lens assembly 110 including a first lens housing 112 and a first driver housing 114 and disposed in the base assembly 20 and moving in parallel with a predetermined optical axis.

The first drive unit housing 114 may include at least one first guide rail unit 118 and a first group of balls 119 disposed on the first guide rail unit 118.

The first guide rail portion 118 may include a first guide body 118a and a first guide groove 118b formed in the first guide body 118a; and a first guide protrusion 118c formed at one side of the first guide body 118a.

The first lens assembly 110 may be stopped by the first group of balls 119 disposed on the first guide rails 118.

When the first lens assembly 110 is stopped, the end of the first guide body 118a may be spaced apart from the inner wall 21S of the base 21 by a predetermined first distance S1.

A cross section of the first guide groove 118b may have a triangular shape.

The base 21 provided in the base assembly 20 may include a third guide recess 21R in a region corresponding to the first guide groove 118b of the first guide rail unit 118.

An embodiment includes a first group of balls 119 in the first guide groove 118b, and the first group of balls 119 include a first ball 119a of the first diameter and the first diameter and a second ball 119b having a second diameter greater than the first diameter, and the second ball 119b may be provided in plural and disposed on both sides of the first ball 119a.

The second ball 119b is disposed outside the first ball 119a, and the first ball 119a can touch only one of the first guide rail 118 and a third guide recess 21R of the base 21.

The second ball 119b may be in contact with the first guide rail 118 and the third guide recess 21R of the base 21 at the same time.

The first group of balls 119 may be plural, and the number of the first balls 119a having the first diameter D1 may be greater than the number of the second balls 119b having the second diameter D2.

The length 119L in which the plurality of first groups of balls 119 are in contact with each other may be ½ or more of the length of the first guide rail 118.

The embodiment may further include a first shock absorbing layer 118d inside the first guide protrusion 118c of the first guide rail 118.

Sidewall recesses 118dr may be included in sidewalls of the first shock absorbing layer 118d.

An embodiment may be a camera module including the lens driving device.

Advantageous Effects

According to the lens driving device and the camera module including the same according to the embodiment, there is a technical effect of reducing friction torque when the lens moves through zooming in the camera module.

In addition, according to the embodiment, there is a technical effect that can solve the problem of lens decent or lens tilt occurs when the zoom movement is reversed by reducing the impact between the lens housing and the stopper.

Accordingly, according to the embodiment, there is a complex technical effect that can significantly improve image quality or resolution by inhibiting lens decent or lens tilt generation while minimizing friction torque.

In addition, according to the embodiment, there is a technical effect that can reduce the impact between the lens housing and the stopper to solve the problems of the reliability of the magnet mounted on the lens housing, damage of the stopper itself, and deterioration of control characteristics.

The technical effects of the embodiments are not limited to those described in this section, but include those that can be recognized from the description of the invention.

MODE FOR INVENTION

Hereinafter, embodiments will be described in detail with reference to the accompanying drawings.

On the other hand, in the description of the embodiment, in the case of being described as being formed in "top/bottom" or "up/down" of each element, "top/bottom" or "up/down" means that two components are in direct contact with each other, or that one or more other components are formed indirectly between the two components. In addition, when expressed as "top/bottom" or "up/down", the meaning of not only an upward direction but also a downward direction based on one configuration may be included.

In addition, relational terms such as "up/upper/above" and "low/lower/below" used hereinafter may not require or imply any physical or logical relationship or order between such components or elements. It may be used to distinguish one component or element from another component or element.

In addition, in the description of the embodiment, terms such as "first" and "second" may be used to describe various elements, but these terms are used for the purpose of distinguishing one element from other elements. In addition, terms specifically defined in consideration of the configuration and operation of the embodiment are only for describing the embodiment, and do not limit the scope of the embodiment.

Embodiment

Figure 1:
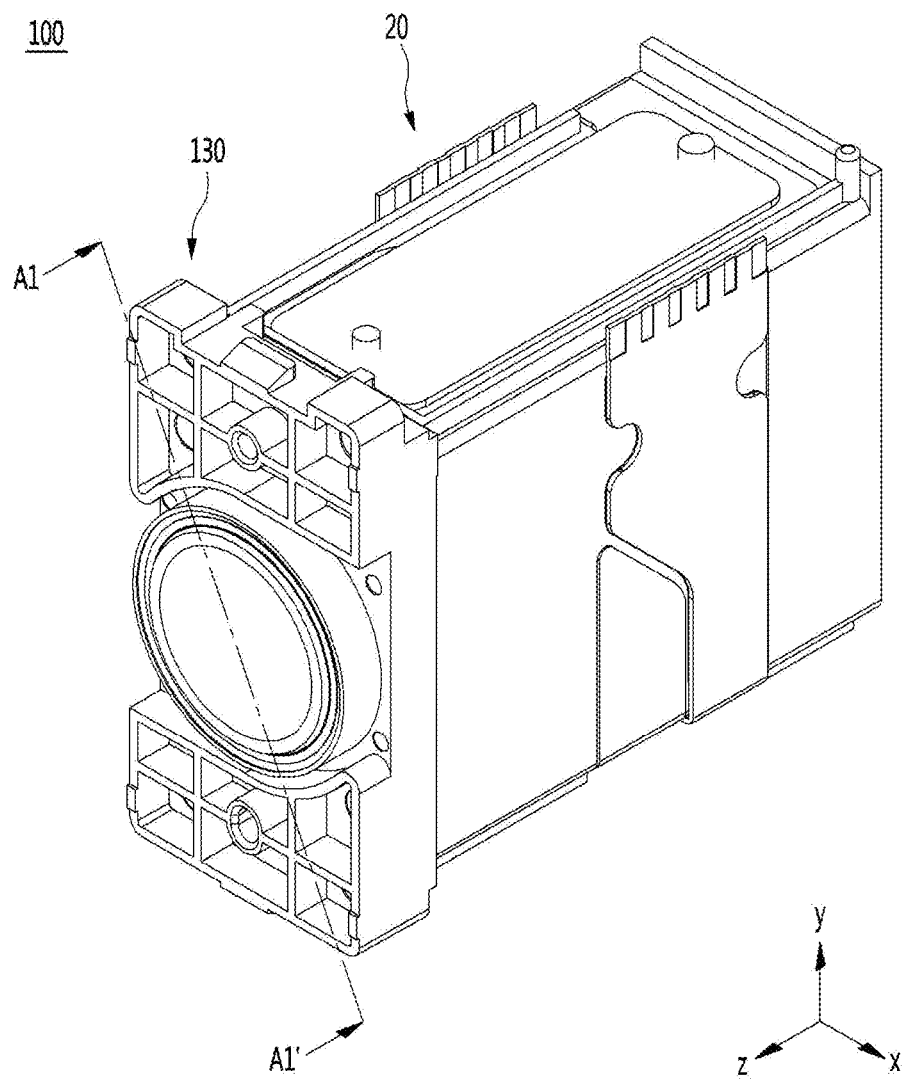
FIG. 1 is a perspective view of a camera module according to an embodiment.
Figure 2:
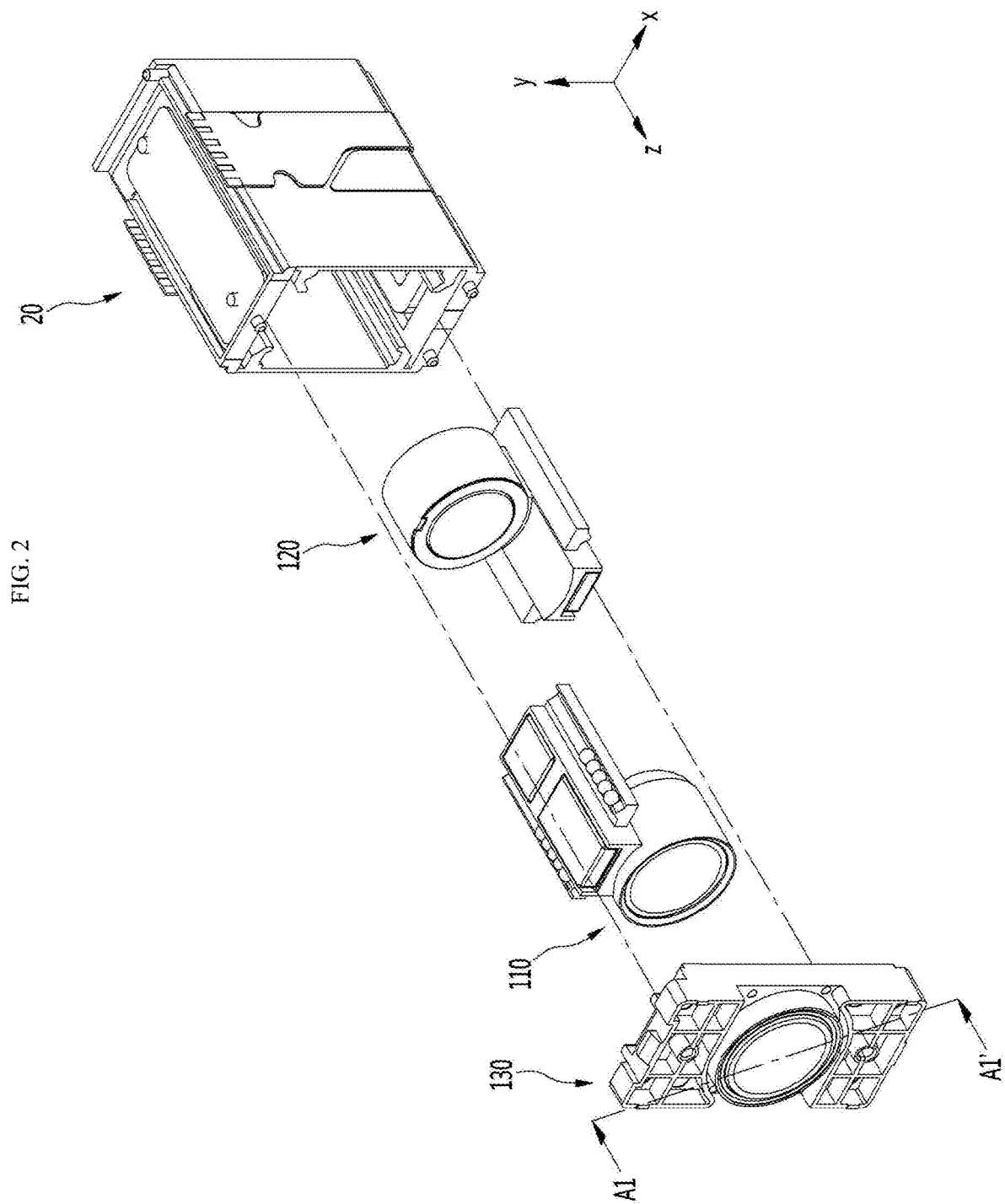
FIG. 2 is an exploded perspective view of the camera module according to the embodiment shown in FIG. 1.

FIG. 1 is a perspective view of a camera module 100 according to an embodiment, and FIG. 2 is an exploded perspective view of the camera module 100 according to the embodiment shown in FIG. 1.

In the xyz axis direction shown in FIGS. 1 and 2, the xz plane represents the ground, the z axis represents the optical axis direction or parallel thereto, and the x axis is the direction perpendicular to the z axis in the ground (xz plane). The y-axis may mean perpendicular to the ground.

Referring to FIGS. 1 and 2, the camera module 100 according to the embodiment includes various optical systems disposed on a predetermined base 20 such as a first lens assembly 110, a second lens assembly 120, and a third lens group 130. And one side of the base 20, for example, one side of the base 20 in the direction of the third lens group 130 may be coupled to the lens cover 30, and a predetermined image sensor unit (see FIG. 5) may be disposed on the other side of the base 20, for example, at the direction of the first lens assembly 110.

In the following description of the embodiment, two moving lens groups are described, but the present invention is not limited thereto. The moving lens group may be three, four, or five or more.

For example, referring to FIG. 2, in an embodiment, the first lens assembly 110 and the second lens assembly 120 may be a moving lens group, and the third lens assembly 130 may be a fixed lens group. In addition, the optical axis direction z may mean a direction that is the same as or parallel to the direction in which the lens groups are aligned.

For example, referring to FIG. 2, the camera module 100 according to the embodiment includes a first lens assembly 110, a second lens assembly 120, and a third lens assembly 130 to perform a zooming function.

In this case, in the embodiment, the third lens assembly 130 may perform a focator function to form parallel light at a specific position.

Next, the first lens assembly 110 may perform a variable function of reimaging the image formed in the third lens assembly 130 which is the condenser. Meanwhile, in the first lens assembly 110, the distance or the image distance with the subject is changed a lot, and thus the magnification change may be large. The first lens assembly 110, which is a changer, plays an important role in the focal length or magnification change of the optical system.

On the other hand, images that are formed in the first lens assembly 110, which is a translator, may differ slightly depending on the location.

Accordingly, the second lens assembly 120 may function as a position compensation for the image formed by the changer. For example, the second lens assembly 120 is a compensator that serves to accurately image an image formed in the first lens assembly 110, which is a translator, at a position of the actual image sensor unit 25 (see FIG. 5) such that compensator function can be performed.

Hereinafter, each configuration of the camera module according to the embodiment will be described in detail with reference to FIGS. 3 to 13B.

Figure 3:
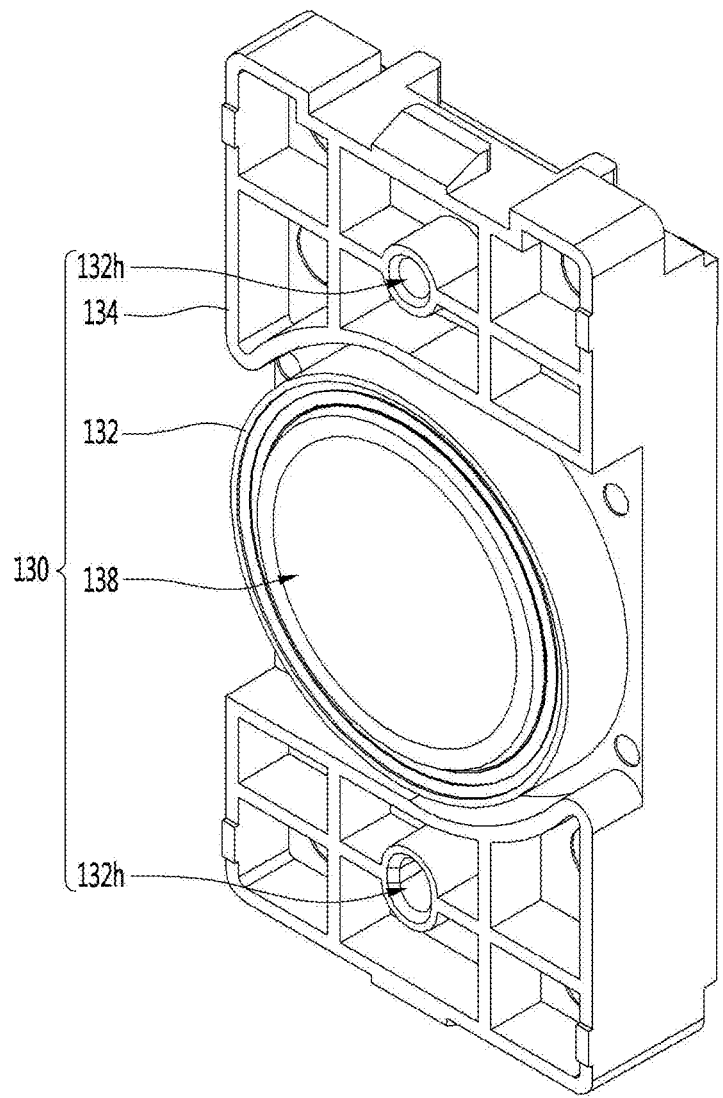
FIG. 3 is a perspective view of a third lens assembly in the camera module according to the embodiment shown in FIG. 2.

FIG. 3 is a perspective view of the third lens assembly 130 in the camera module according to the embodiment shown in FIG. 2.

Referring to FIG. 3, in an embodiment, the third lens assembly 130 includes a third lens housing 132 on a predetermined lens cover 134 and a third lens group 138 may be mounted on the third lens housing 132. The third lens group 138 may include a single lens or a plurality of lenses.

The lens cover 134 may be fitted with the base assembly 20 by fitting or adhesive. For example, a hook 21p (see FIG. 4) may protrude from a side surface of the base assembly 20, and the lens cover 134 may have a hole (not shown) at a position corresponding to the hook 21p. The hook 21p of the base assembly 20 may be mounted in the hole of the lens cover 134 such that the lens cover 134 may be coupled to the base assembly 20. In addition, the lens cover 134 may be stably coupled to the base assembly 20 by the adhesive.

In addition, the lens cover 134 may be provided with a plurality of hole guides 132h to align with the optical axis, for example, the z-axis.

Figure 4:
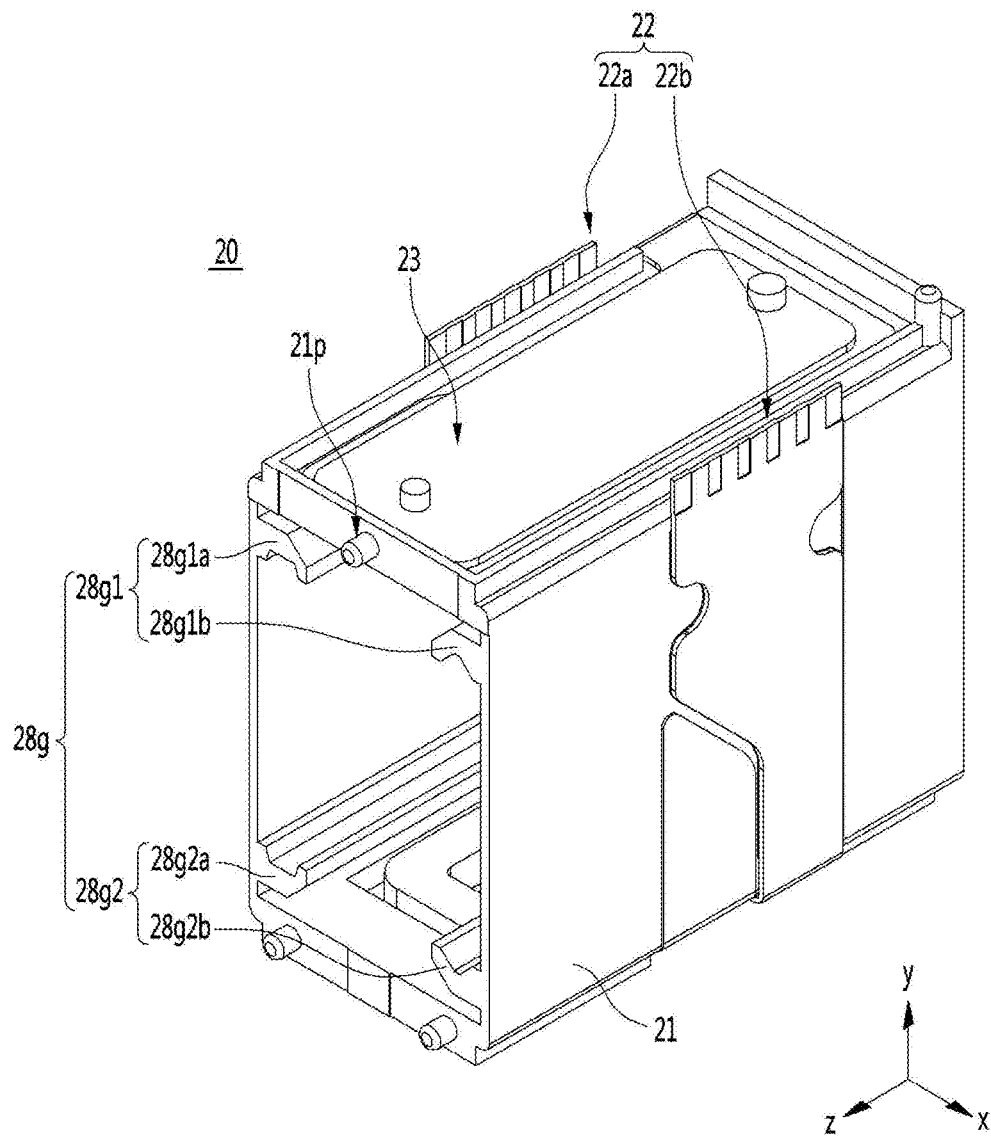
FIG. 4 is a perspective view of the base assembly in the camera module according to the embodiment shown in FIG. 2.
Figure 5:
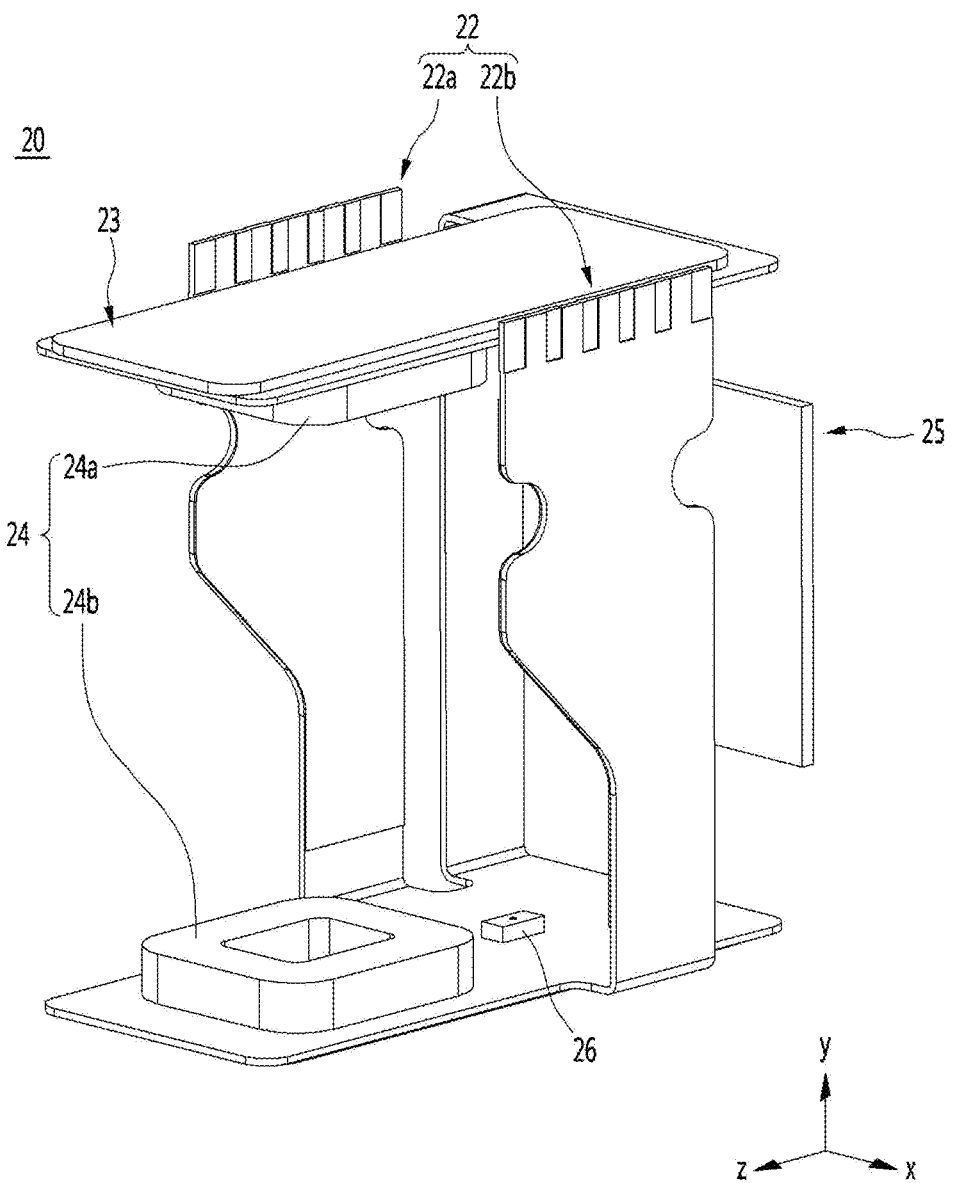
FIG. 5 is a perspective view of the camera module shown in FIG. 3 while the base is removed from the base assembly therefrom.

Next, FIG. 4 is a perspective view of the base assembly 20 in the camera module according to the embodiment shown in FIG. 2, and FIG. 5 is a perspective view while the base 21 is removed from the base assembly 20 of the camera module shown in FIG. 3.

Referring to FIGS. 4 and 5, the base assembly 20 includes a base 21, a circuit board 22, a yoke 23, a coil unit 24, a hall sensor 26, and an image sensor unit 25 and the like.

The material of the base 21 may be formed of any one or more of plastic, glass-based epoxy, polycarbonate, metallic material, or a composite material.

In an embodiment, the third lens assembly 130, the first lens assembly 110, and the second lens assembly 120 may be sequentially disposed in the base 21 in parallel to the optical axis direction. The circuit board 22 including the first circuit board 22a on one side of the base 20 and the second circuit board 22b on the other side of the base 20 may be disposed to be electrically connected to the lens driving units inside the base assembly 20.

Referring to FIGS. 2 and 4, in an embodiment, a predetermined prism (not shown) may be disposed on the third lens assembly 130 side, and the predetermined image sensor unit 25 may be disposed on the side of the second lens assembly 120.

The first lens assembly 110, the second lens assembly 120, the third lens assembly 130, the prism, the image sensor unit 25, and the like may be classified as an optical system.

In an embodiment, the prism can convert the incident light into parallel light. For example, the prism may change the incident light into parallel light by changing the optical path of the incident light to an optical axis (z-axis) parallel to the central axis of the lens group. Thereafter, the parallel light may pass through the third lens assembly 130, the first lens assembly 110, and the second lens assembly 120 to be incident on the image sensor unit 25 to capture an image.

The prism may be an optical member having a triangular prism shape. Embodiments may also employ reflectors or reflective mirror instead of or in addition to prisms.

On the other hand, in the embodiment, when the image sensor unit 25 is not disposed in the direction perpendicular to the optical axis, the light passing through the lens group may be provided with an additional prism (not shown) to be picked up by the image sensor unit 25.

Referring to FIG. 5 for a while, in an embodiment, the image sensor unit 25 may be disposed perpendicular to the optical axis direction of the parallel light. The image sensor unit 25 may include a solid-state imaging device disposed on a predetermined third circuit board (not shown). For example, the image sensor unit 25 may include a Charge Coupled Device (CCD) image sensor or a Complementary Metal-Oxide-Semiconductor (CMOS) image sensor.

Referring to FIG. 5, the base assembly 20 of the embodiment may include a predetermined coil part 24, a yoke 23, and a hall sensor 26 on the circuit board 22.

According to an embodiment, the coil part 24 may include a first coil part 24a disposed on the first circuit board 22a and a second coil part 24b disposed on the second circuit board 22b. The first lens assembly 110 and the second lens assembly 120 may be driven by electromagnetic force.

In addition, the embodiment may include a yoke 23 to control initial positions of the first lens assembly 110 and the second lens assembly 120. In addition, the embodiment may include a Hall sensor 26 to sense the positions of the first lens assembly 110 and the second lens assembly 120.

Referring back to FIG. 4, the base assembly 20 of the embodiment may include a rail guide 28g inside the base 21, and in the embodiment, the first lens assembly 110, the second lens assembly 120 which are a moving lens group may be moved along the rail guide 28g in the optical axis direction.

For example, the rail guide 28g of the embodiment may include a first rail guide 28g1 formed at one side of the base 21 and a second rail guide 28g2 formed at the other side of the base. The first rail guide 28g1 may be formed in a singular or plural number, and may include, for example, a first-first rail guide 28g1a and a first-second rail guide 28g1b, but is not limited thereto.

In addition, the second rail guide 28g2 may be formed in the singular or plural, and may include, for example, a second-first rail guide 28g2a and a second-second rail guide 28g2a, but is not limited thereto.

In the embodiment, the rail guide 28g may be disposed in a direction parallel to the optical axis direction, and the rail guide 28g may be formed of the same or similar material as that of the base 21. For example, the rail guide 28g may be formed of any one or more of plastic, glass-based epoxy, polycarbonate, metal, or a composite material, but is not limited thereto.

The rail guide 28g supports the first lens assembly 110 or the second lens assembly 120 while zooming to inhibit decentralization or lens tilt of the lens such that there is a technical effect to improve image quality or resolution.

Hereinafter, the features of the first lens assembly 110 will be described with reference to FIGS. 6A and 6B, and the features of the second lens assembly 120 will also be described with reference to FIGS. 7A and 7B.

Figure 6A:
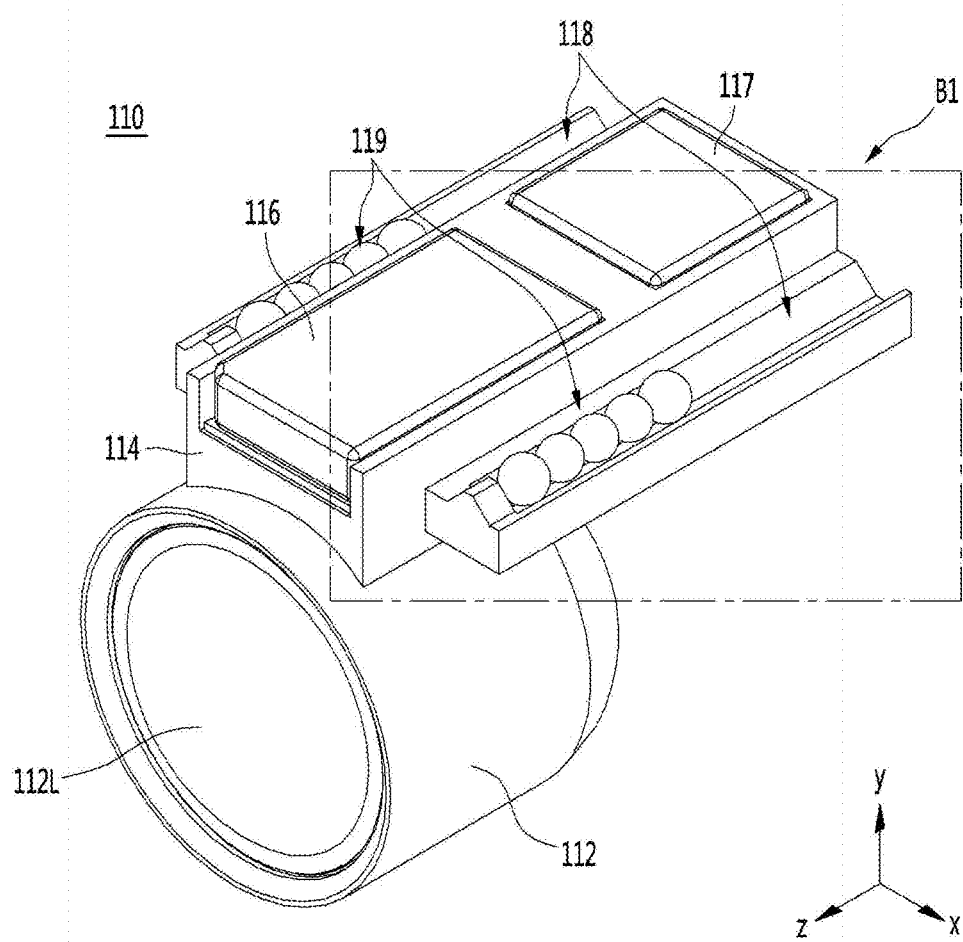
FIG. 6A is a perspective view of a first lens assembly of the camera module according to the illustrated embodiment shown in FIG. 2.

FIG. 6A is a perspective view of the first lens assembly 110 of the camera module according to the embodiment shown in FIG. 2.

Figure 6B:
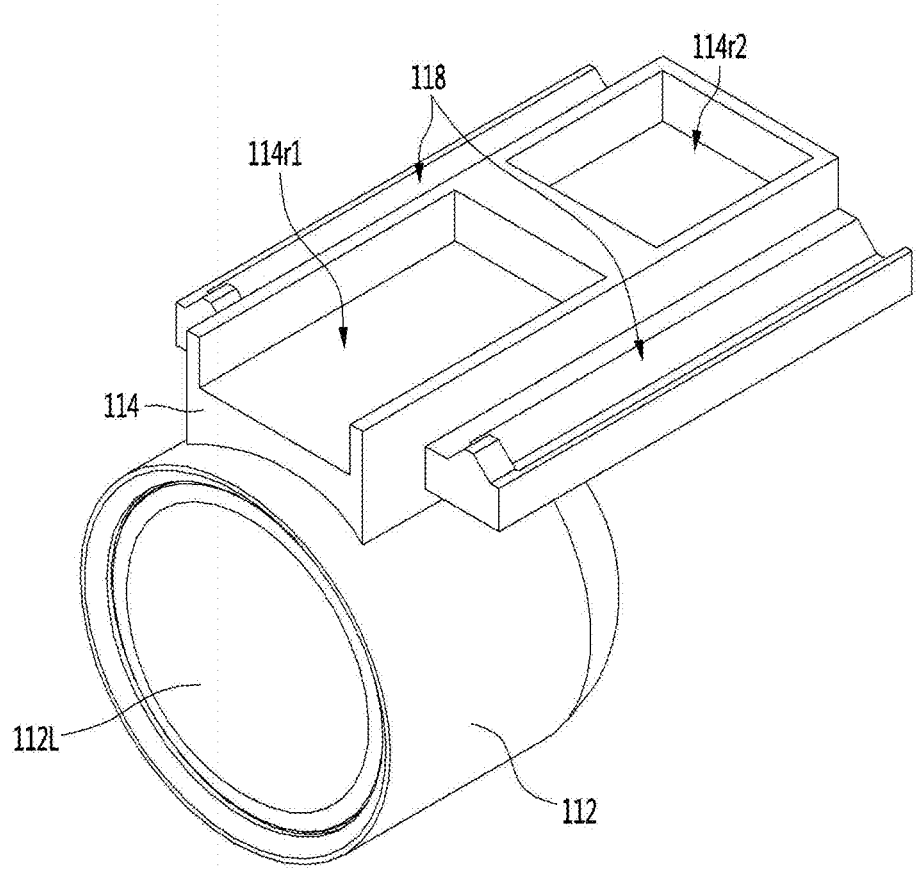
FIG. 6B is a view of some components removed from the first lens assembly of the camera module according to the embodiment shown in FIG. 6A.

In addition, FIG. 6B is a view in which some components are removed from the first lens assembly 110 of the camera module according to the embodiment shown in FIG. 6A. For example, FIG. 6B is a camera module in which the first group of balls 119, the first driving magnet 116, and the first sensing magnet 117 are removed from the first lens assembly 110 according to the embodiment shown in FIG. 6A.

Figure 7A:
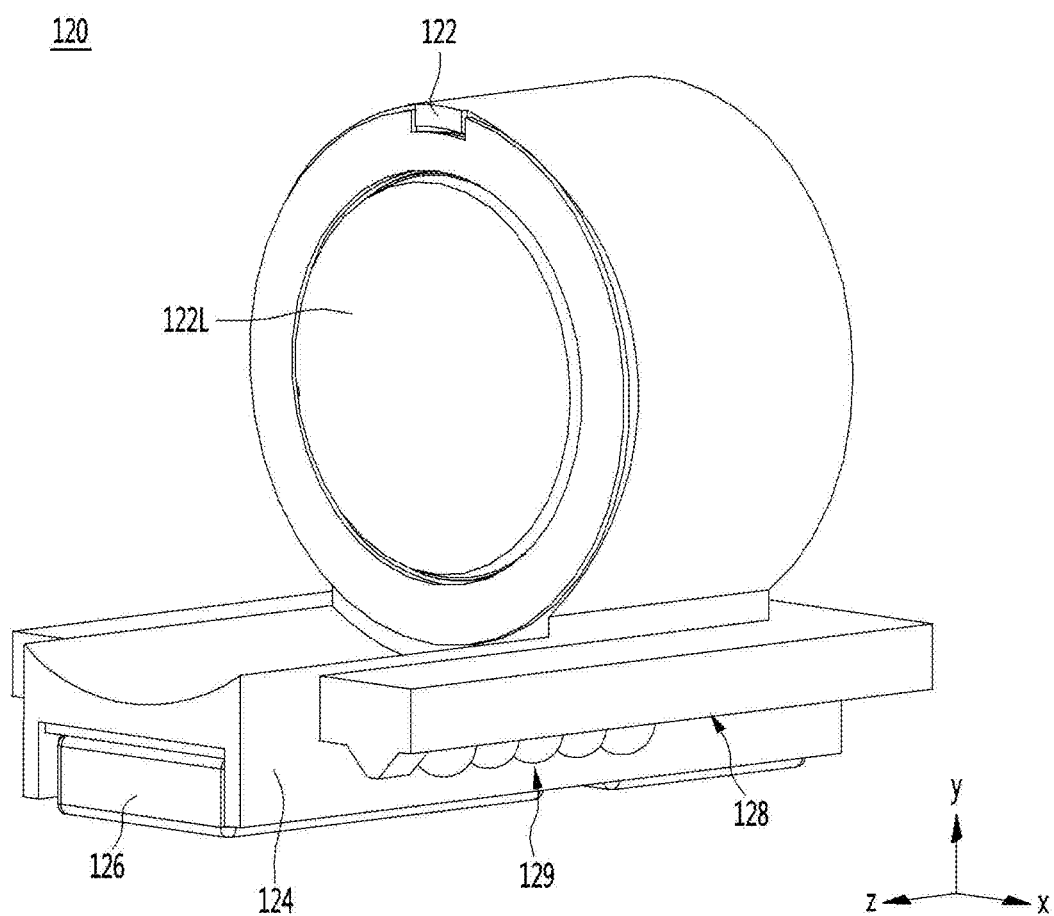
FIG. 7A is a perspective view of a second lens assembly of the camera module according to the illustrated embodiment shown in FIG. 2.
Figure 7B:
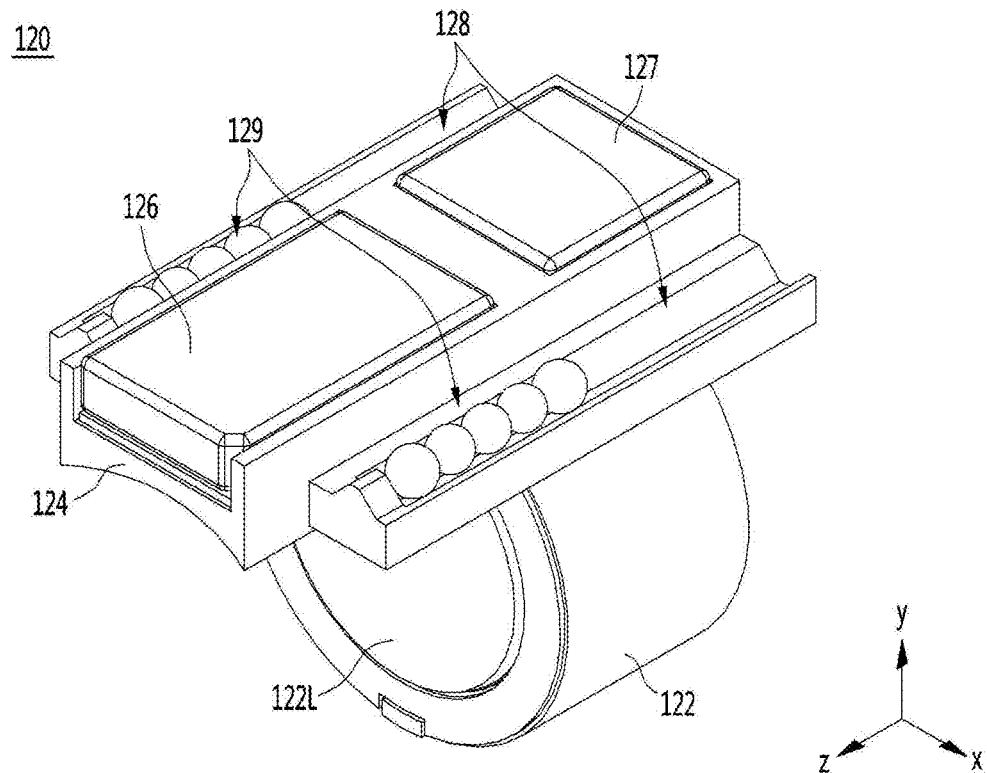
FIG. 7B is a perspective view rotated 180 degrees about the optical axis of the second lens assembly of the camera module according to the embodiment shown in FIG. 8A.

FIG. 7A is a perspective view of the second lens assembly 120 of the camera module according to the shown embodiment shown in FIG. 2, and FIG. 7B is a perspective view rotated 180 degrees with respect to the optical axis of 120 of the second lens assembly of the camera module according to the shown embodiment shown in FIG. 7A.

Referring to FIGS. 6A and 6B, in an embodiment, the first lens assembly 110 may include a first lens housing 112 and a first driver housing 114.

The first lens group 112L may be disposed in the first lens housing 112. The first lens housing 112 may function as a barrel or a lens case where the first lens group 112L may be mounted. The first lens group 112L may be a moving lens group, and may include a single lens or a plurality of lenses.

Referring to FIGS. 7A and 7B, the second lens assembly 120 may include a second lens housing 122 and a second driver housing 124. A second lens group 122L may be disposed in the second lens housing 122.

Referring to FIGS. 6A and 6B, the first drive unit housing 114 includes a first guide rail unit 118, a first group of balls 119, a first drive magnet 116, and a first sensing magnet 117.

Referring to FIG. 6B, the first driving unit 114 may include a first recess 114r1 and a second recess 114r2 on one surface thereof, and a first driving magnet 116 may be disposed in the first recess 114r1, and a first sensing magnet 117 may be disposed in the second recess 114r2.

The first driving magnet 116 may drive the first lens assembly 110 by electromagnetic force by interacting with the first coil part 24a disposed in the base assembly 20. In addition, the first sensing magnet 117 may interact with the hall sensor 26 disposed in the base assembly 20 to sense the position of the first lens assembly 110.

The first driving magnet 116 and the first sensing magnet 117 may be a permanent magnet, but is not limited thereto. The magnetization method of the first driving magnet 116 in the camera module according to the embodiment may be a vertical magnetization method, but is not limited thereto. For example, in the embodiment, both the N pole and the S pole of the first driving magnet 116 may be magnetized to face the first coil unit 24a. Accordingly, the N pole and the S pole of the first driving magnet 116 may be disposed to correspond to the region in which the current flows in the first coil unit 24a, and the first driving magnet 116 and the first coil unit 24a may be disposed. The first lens assembly 110 may be driven by the electromagnetic force between the two elements, and the electromagnetic force may be controlled in proportion to the current applied to the first coil unit 24a.

Referring back to FIG. 6A, the first driver housing 114 may include one or more first guide rail units 118 and a first group of balls 119 disposed on the first guide rail units 118. The first guide rail portions 118 may include one first guide rail portion 118 and another first guide rail portion 118 spaced apart from each other in a first direction perpendicular to the optical axis. As seen in FIG. 6A, a width of the first sensing magnet 117 (and the first driving magnet 116) in the first direction may be smaller than a distance between one first guide rail portion 118 and the other first guide rail portion 118 in the first direction.

The first guide rail unit 118 may include two first guide rail units 118 disposed on one side and the other side of the first driving unit housing 114, and the first group of the ball 119 is disposed in the first guide rail unit 118. The first lens assembly 110 may be moved parallel to the optical axis direction by rolling along the first guide rail unit 118. As seen in at least FIGS. 6A and 6B, each first guide rail unit 118 can include a portion that overlaps the first lens housing 112 in a second direction perpendicular to the optical axis and the first direction and a portion that does not overlap the first lens housing in the second direction. Also as seen in at least FIGS. 6A and 6B, the first driver housing 114 may include a first body region overlapping the first lens housing 112 in the second direction and a second body area not overlapping the first lens housing 112 in the second direction; at least a portion of the first sensing magnet 117 may be disposed in the second body region.

The first group of ball 119 may include a plurality of balls, which will be described in more detail later with reference to FIG. 8.

According to the embodiment, when the lens is moved through zooming, there is a technical effect of reducing friction torque by rolling driving through the first guide rail 118 and the first group of ball 119.

Next, referring to FIGS. 7A and 7B, the second lens assembly 120 may include a second guide rail portion 128, a second group of balls 129, and a second driving magnet in the second driving unit housing 124. 126 and the second sensing magnet 127.

Through this, in the camera module according to the embodiment, an electromagnetic force between the second driving magnet 126 and the second coil part 24b may be generated to move the second lens assembly 120 horizontally to the optical axis.

In addition, the second sensing magnet 127 may interact with the hall sensor 26 disposed in the base assembly 20 to sense the position of the second lens assembly 120.

In addition, the second guide rail unit 128 may be disposed on one side and the other side of the second driving unit housing 124, respectively, and the second group of ball 129 may be disposed in the second guide rail unit 128. Thus, the second lens assembly 120 may be moved parallel to the optical axis direction by rolling along the second guide rail portion 128. Therefore, there is has a technical effect in that the second guide rail portion 128 and the rolling drive through the second group of ball 129 can reduce the friction torque when moving the lens through zooming.

Figure 8:
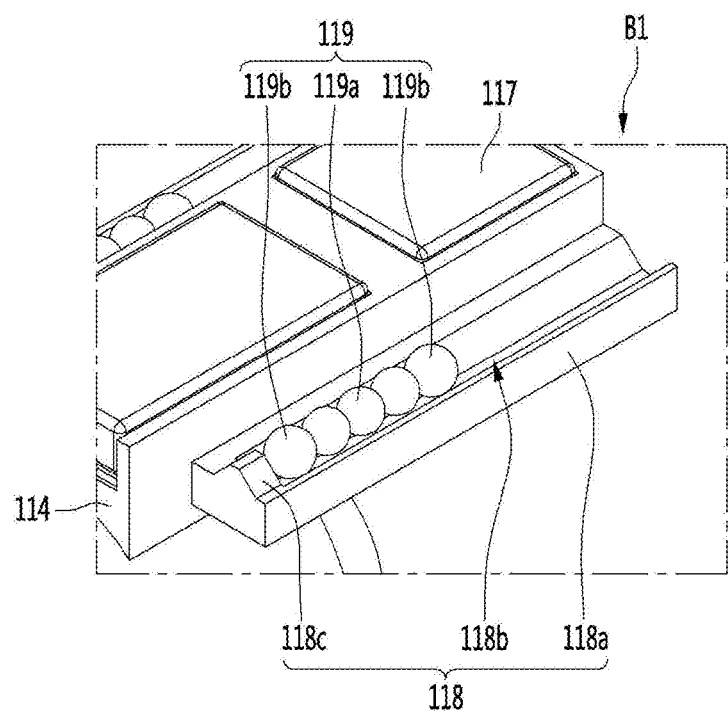
FIG. 8 is an enlarged view of a first region in a first lens assembly of the camera module according to the embodiment shown in FIG. 6A.

Next, FIG. 8 is an enlarged view of the first region B1 in the first lens assembly 110 of the camera module according to the embodiment shown in FIG. 6A.

The first driving unit 114 may include one or more first guide rails 118 and a first group of balls 119 disposed on the first guide rails 118. The first group of balls 119 may include a first ball 119a and a second ball 119b having different diameters. In addition, the first driver housing 114 may include a first driving magnet 116 and a first sensing magnet 117.

The first guide rail portion 118 is formed on a first guide body 118a, a first guide groove 118b formed in the first guide body 118a, and a first guide protrusion 118c on one side of the first guide body 118a.

The cross section of the first guide groove 118b in the first guide rail portion 118 may have a triangular shape, and accordingly, the second ball 119b has three technical points to minimize friction torque.

For example, the second ball 119b has two-point contacts with the first guide groove 118b having a triangular cross section, and one point contact with the recess 21R (see FIG. 10) of the base for a total of three points such that friction torque can be minimized.

Accordingly, according to the lens driving device and the camera module including the same according to the embodiment, there is a technical effect of reducing friction torque when the lens moves through zooming in the camera module. Since the embodiment can stably guide the lens assembly 110, there is a technical effect of inhibiting lens decenter or lens tilt from occurring when the lens moves through the zooming in the camera module.

Figure 9:
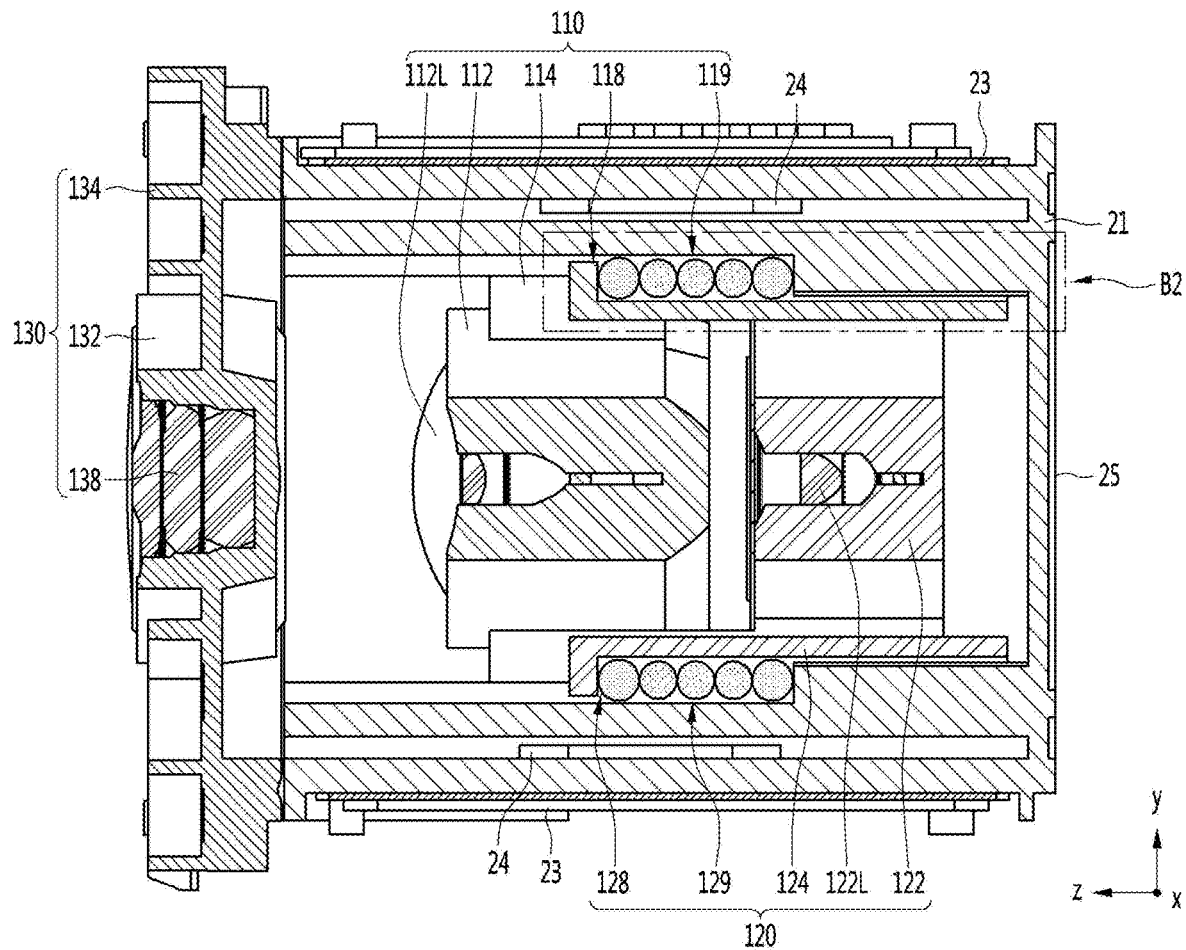
FIG. 9 is a cross-sectional view taken along line A1-A1' of the camera module according to the embodiment shown in FIGS. 1 and 2.

Next, FIG. 9 is a cross-sectional view taken along line A1-A1' of the camera module according to the embodiment shown in FIGS. 1 and 2, and the first guide rail 118 and the first group of the first lens assembly 110 are shown. It is a sectional view in which the ball 119, the second guide rail 128 of the second lens assembly 120, and the second group of balls 129 are shown together.

Referring to FIG. 9, the third lens assembly 130, the first lens assembly 110, and the second lens assembly 120 may be disposed parallel to the optical axis (z-axis) in the base 21. The image sensor unit 25 may be disposed in the direction of the two lens assembly 120. The configuration shown in FIG. 9 may employ the technical features of the above-described configuration, and further technical features will be described below with reference to FIG. 10.

Figure 10:
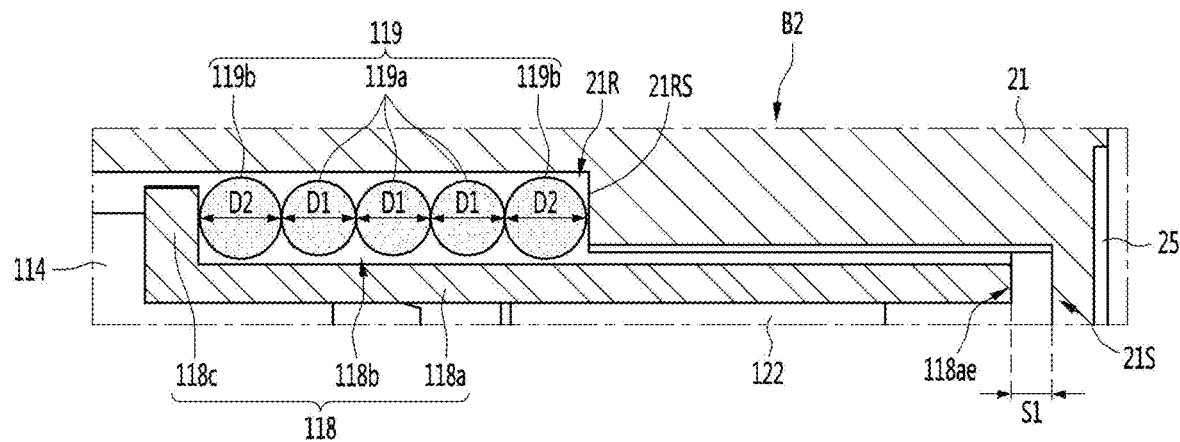
FIG. 10 is an enlarged view of a second area of the camera module according to the embodiment shown in FIG. 9.

FIG. 10 is an enlarged view of a second area B2 associated with the first lens assembly 110 of the camera module according to the embodiment shown in FIG. 9.

In an embodiment, the first guide rail portion 118 of the first lens assembly 110 may include a first guide body 118a, a first guide groove 118b and a first guide protrusion 118c formed on one side of the guide body 118a.

In addition, the first lens assembly 110 may include a first group of balls 119 disposed on the first guide rail 118 to reduce friction torque when the lens moves through zooming.

At this time, in the embodiment, the base 21 may include a third guide recess 21R therein. For example, the base 21 may include a third guide recess 21R in a region corresponding to the first guide groove 118b of the first guide rail unit 118.

Through this, the first guide groove 118b and the third guide recess 21R form a moving space for the first group of balls 119 such that the lens assembly 110 may be driven by rolling.

Next, in the embodiment, the first group of balls 119 may include balls of different diameters. For example, the first group of balls 119 may include a first ball 119a having a first diameter D1 and a second ball 119b having a second diameter D2 larger than the first diameter D1. The second ball 119b may be provided in plural and disposed on both sides of the first ball 119a. One or more first balls 119a may be provided, for example, three but not limited thereto.

According to the embodiment, the second ball 119b having a larger diameter is disposed outside the first ball 119a having a smaller diameter, so that the first ball 119a can be in contact with only one of the first guide rail 118 or the third guide recesses 21R of the base 21. The second ball 119b can be in contact with both the first guide rail 118 and the third guide recess 21R of the base 21 at the same time, thereby minimizing the contact area of the first group balls 119. Through this, there is a technical effect of reducing frictional torque when the lens is moved through zooming in the camera module.

In addition, in the embodiment, the first group of balls 119 can be plural, and the number of the first balls 119a of the first diameter D1 can be controlled greater than the number of the second balls 119b of the second diameter D2. So, the first group of balls 119 stably supports and moves the first lens assembly 110, thereby minimizing friction torque during zooming without lens decent or lens tilt of the lens. There is a complex technical effect that can inhibit the occurrence of tilt and significantly improve image quality or resolution.

In particular, as described above, in the camera module of the related art, the lens housing is moved within a predetermined stroke range by mechanical movement using a lens driving device for a zooming function. It may be stopped by the stopper and reversal of the zoom movement may be possible.

However, in the related art, an impact of a lens mounted on a lens housing may occur due to an impact of a lens housing and a stopper, and there is a technical problem in that the lens decenter or lens tilt may occur when the zoom movement is reversed.

Therefore, in order to solve this technical problem, the first lens assembly 110 can be stopped by the first group of balls 119 disposed on the first guide rail 118 thereby providing improvement of the shock absorbing force with the first group of balls 119. So, there is a technical effect that can solve the problem of lens decent or lens tilt occurs when the zoom movement is reversed.

According to an embodiment, when the first lens assembly 110 moves away from the incident direction of light, the first lens assembly 110 can be stopped by the first group of balls 119 disposed on the first guide rail 118. So, the stop function of first lens assembly 110 can be improved by the shock absorbing power of the plurality of first groups of balls 119, and the impact in the lens housing when the zoom movement is reversed can be reduced. There is a technical effect to solve the problems, such as an un-reliability of the magnet mounted in the lens housing, a damage of the stopper itself, a deterioration of the control characteristics, etc.

For example, referring to FIG. 10, the first group of balls 119 are located within the first guide protrusion 118c of the first guide rail 118 and the guide sidewall 21RS of the inner side of the base 21. When in close contact with each other, the first guide rail 118 may stop and the first lens assembly 110 may also stop.

At this time, an end 118ae of the first guide body 118a is spaced apart from the inner wall 21S of the base 21 by a first distance S1, so that there is a special technical effect that can inhibit the impact of the lens decent or lens tilt during the inversion of the zoom movement by inhibiting the collision between the first lens assembly 110 and the base 21 itself does not occur.

Figure 11:
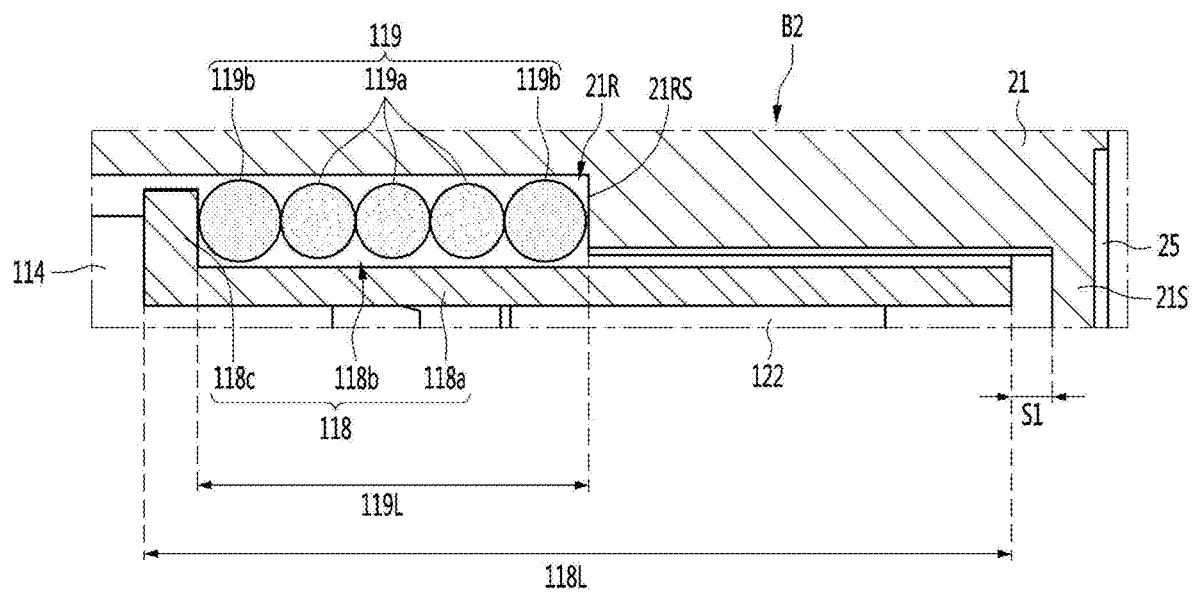
FIG. 11 is a detailed view of a second area of the camera module according to the embodiment shown in FIG. 10.

Next, FIG. 11 is a detailed view of the second area B2 of the camera module according to the embodiment shown in FIG. 10.

In an embodiment, the length 119L in which the plurality of first groups of balls 119 are in contact with each other may be ½ or more of the length 118L of the first guide rail 118.

Through this, in an embodiment, the first group of balls 119 is plural, and the first group of balls 119 stably supports the first lens assembly 110 and moves such that there is a technical effect to improve image quality or resolution by minimizing torque and inhibiting lens decent or lens tilt during zooming.

Figure 12:
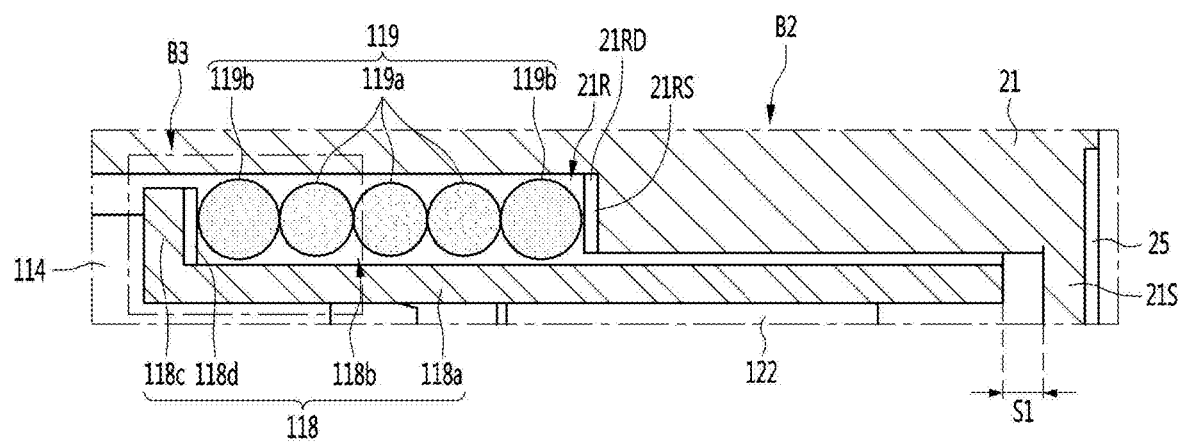
FIG. 12 shows a further embodiment of a second region of the camera module according to the embodiment shown in FIG. 10.

FIG. 12 is a view of a further embodiment of the second area B2 of the camera module according to the embodiment shown in FIG. 10.

According to the embodiment, the first shock absorbing layer 118d may be further disposed inside the first guide protrusion 118c of the first guide rail 118. According to an embodiment, when the first lens assembly 110 is stopped by the first group of balls 119 disposed on the first guide rail 118, the impact absorption power can be improved by the plurality of first group of balls 119, and the impact between the first group balls 119 and the first guide protrusions 118c can be minimized by the first impact absorption layer 118d. Accordingly, there is a technical effect of effectively solving a problem that a lens decent or a lens tilt occurs when the zoom movement is reversed.

The first shock absorbing layer 118d may be formed of a material having a higher shock absorbency than the material of the first guide protrusion 118c. For example, the first shock absorbing layer 118d may be formed of a shock absorbing material such as a soft metal such as urethane material, Al, an elastic material, or a fiber material, but is not limited thereto.

Figure 13A:
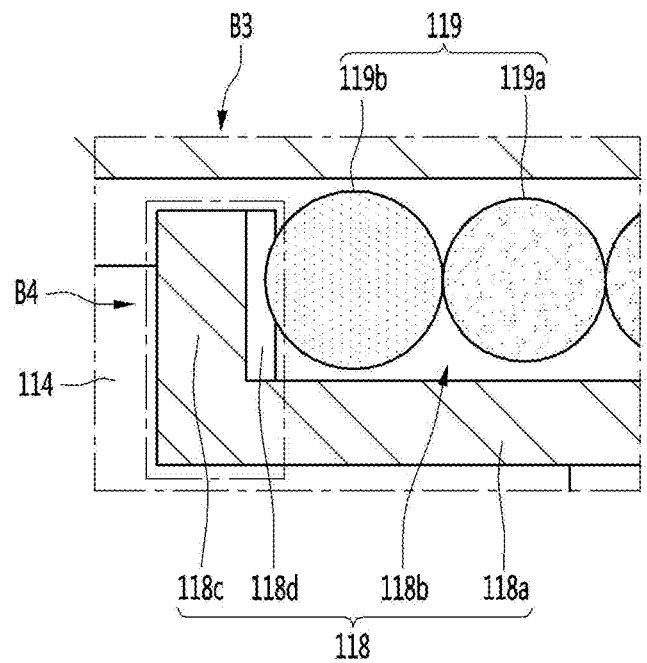
FIG. 13A is another enlarged view of the third region of the camera module according to the embodiment shown in FIG. 12.
Figure 13B:
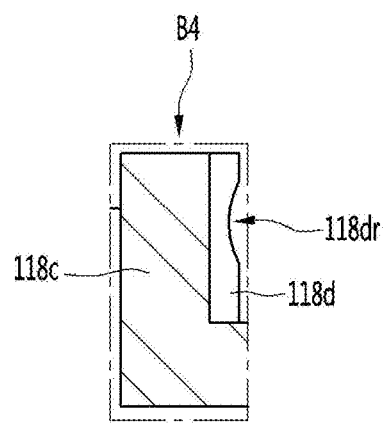
FIG. 13B is an enlarged view of a fourth region of the camera module according to the embodiment shown in FIG. 13A.

Next, FIG. 13A is an enlarged view of another embodiment of the third area B3 of the camera module according to the embodiment shown in FIG. 12, and FIG. 13B is an enlarged view of the fourth area B4 of the camera module according to the embodiment shown in FIG. 13A.

Referring to FIGS. 13A and 13B, the sidewalls of the first shock absorbing layer 118d are recessed to correspond to the outer shape of the first group of balls 119 so as to correspond to the outer shape of the first group of balls 119. By providing a colliding contact area with the first group of balls 119 can be increased to distribute the impact.

According to an embodiment, when the first lens assembly 110 is stopped by the first group of balls 119 disposed on the first guide rail 118, the impact absorption power can be improved by the plurality of first group of balls 119, and also the impact between the first group balls 119 and the first guide protrusions 118c can be further minimized by the first impact absorption layer 118d. Accordingly, there is a technical effect of effectively solving a problem that a lens decent or a lens tilt occurs when the zoom movement is reversed.

According to the lens driving device and the camera module including the same according to the embodiment, there is a technical effect of reducing friction torque when the lens moves through zooming in the camera module.

In addition, according to the embodiment, there is a technical effect that can solve the problem of lens decent or lens tilt occurs when the zoom motion is inverted by reducing the impact between the lens housing and the stopper.

Accordingly, according to the embodiment, there is a complex technical effect that can significantly improve image quality or resolution by minimizing friction torque while zooming or by prevention lens tilt generation due to minimizing friction torque.

In addition, according to the embodiment, there is a technical effect that can reduce the impact between the lens housing and the stopper to solve the problems of the un-reliability of the magnet mounted on the lens housing, damage of the stopper itself, deterioration of control characteristics.

INDUSTRIAL APPLICABILITY

The embodiment may be applied to a mobile terminal such as a mobile phone, a notebook, a drone, a vehicle, and the like.

For example, the camera module according to the embodiment may be embedded in a portable device such as a smartphone, a tablet PC, a notebook computer, and the like.

The camera module according to the embodiment may perform an autofocus function that automatically adjusts the distance between the image sensor and the lens to align the focal length of the lens.

Features, structures, effects, etc. described in the above embodiments are included in at least one embodiment, but are not necessarily limited to one embodiment. Furthermore, the features, structures, effects, and the like illustrated in the embodiments may be combined or modified with respect to other embodiments by those skilled in the art to which the embodiments belong. Therefore, it should be interpreted that the contents related to such combinations and modifications are included in the scope of the embodiments.

Although the embodiments have been described above, the embodiments are only examples, and are not intended to limit the embodiments. Those skilled in the art to which the embodiments pertain may have several examples that are not exemplified above without departing from the essential characteristics of the present embodiments. It will be understood that modifications and applications of the branches are possible. For example, each component specifically shown in the embodiment can be modified. And differences relating to these modifications and applications will have to be construed as being included in the scope of the embodiments set forth in the appended claims.

The invention claimed is:

1. A lens driving device, comprising:
   a base assembly; and
   a first lens assembly including a first lens housing and a first driving unit housing disposed in the base assembly, and moving in parallel with a predetermined optical axis;
   wherein the first drive unit housing comprises at least one first guide rail portion and a first group of balls disposed on the first guide rail portion,
   wherein the first guide rail portion comprises a first guide body, a first guide groove formed in the first guide body, and a first guide protrusion formed on one side of the first guide body, and wherein the first guide rail portion comprises a first shock absorbing layer inside the first guide protrusion.

2. The lens driving device according to claim 1, wherein the first lens assembly is stopped by the first group of balls arranged on the first guide rail portion, and an end of the first guide body is spaced apart from an inner wall of a base by a first distance when the first lens assembly is stopped.

3. The lens driving device according to claim 1, wherein a cross section of the first guide groove comprises a triangular shape.

4. The lens driving device according to claim 1, wherein a base provided in the base assembly includes a third guide recess in an area corresponding to the first guide groove of the first guide rail portion, wherein the first group of balls are in the first guide groove, wherein the first group of balls includes a first ball of a first diameter and a second ball of a second diameter greater than the first diameter, and wherein a plurality of the second ball are disposed on both sides of the first ball.

5. The lens driving device according to claim 4, wherein the second ball is disposed outside the first ball, and the first ball is in contact with only one of the first guide rail portion and the third guide recess of the base.

6. The lens driving device according to claim 4, wherein the second ball is in contact with the first guide rail portion and the third guide recess of the base at the same time.

7. The lens driving device according to claim 4, wherein the first group of balls comprises a plurality of balls, and wherein a number of the first ball of the first diameter is greater than the number of the second ball of the second diameter.

8. The lens driving device according to claim 4, wherein a contact length of the balls arranged in contact with the plurality of first group of balls is ½ or more of a length of the first guide rail portion.

9. The lens driving device according to claim 4, wherein the base assembly includes a rail guide inside the base, and the first lens assembly moves along the rail guide.

10. The lens driving device according to claim 9, wherein the rail guide includes a first rail guide at one side of the base and a second rail guide at an other side of the base.

11. The lens driving device according to claim 10, wherein the first rail guide includes a first-first rail guide and a first-second rail guide and the second rail guide includes a second-first rail guide and a second-second rail guide.

12. The lens driving device according to claim 4, wherein a length of the second diameter is greater than a height of the third guide recess.

13. The lens driving device according to claim 4, wherein a length of the second diameter is greater than a height of the first shock absorbing layer.

14. A camera module comprising the lens driving device according to claim 1.

15. The lens driving device according to claim 1, wherein the first shock absorbing layer comprises a side recess on a sidewall thereof.

16. A lens driving device, comprising:
a base assembly; and a first lens assembly including a first lens housing and a first driving unit housing disposed in the base assembly, and moving in parallel with a predetermined optical axis;

wherein the first drive unit housing comprises at least one first guide rail portion and a first group of balls disposed on the first guide rail portion, wherein the first guide rail portion comprises a first guide body, a first guide groove formed in the first guide body, and a first guide protrusion formed on one side of the first guide body, wherein a base provided in the base assembly includes a third guide recess in an area corresponding to the first guide groove of the first guide rail portion, and wherein the base comprises a second shock absorbing layer inside the third guide recess.

17. A lens driving device, comprising:
a base assembly; and
a first lens assembly including a first lens housing and a first driving housing disposed inside the base assembly, and configured to move parallel to an optical axis, wherein the first driving housing comprises:
a housing body to extend in a direction parallel to the optical axis;

a first guide recess and a second guide recess disposed on the housing body and spaced apart from each other in a first direction perpendicular to the optical axis;

a first group of balls and a second group of balls disposed in the first guide recess and the second guide recess, respectively;

a magnet disposed on the housing body between the first guide recess and the second guide recess, wherein a first width of the housing body in the direction parallel to the optical axis is greater than a second width of the housing body in the first direction perpendicular to the optical axis, wherein a first width of the magnet in the direction parallel to the optical axis is greater than a second width of the magnet in the first direction perpendicular to the optical axis, wherein the first guide recess comprises a first portion overlapping the first lens housing in a second direction perpendicular to the optical axis and the first direction, and a second portion not overlapping the first lens housing in the second direction, and wherein the magnet comprises: a driving magnet disposed on the housing body between the first guide recess and the second guide recess; and a sensing magnet disposed on the housing body between the first guide recess and the second guide recess.

18. The lens driving device according to claim 17, wherein the housing body comprises:
a first body region overlapping the first lens housing in a second direction perpendicular to the optical axis and the first direction; and a second body area not overlapping the first lens housing in the second direction, wherein at least one portion of the magnet is disposed in the second body area, and wherein a width of the driving magnet in the first direction is smaller than a distance between the first guide recess and the second guide recess in the first direction.

* * * * *